3,068,144
PROCESSES OF CONTROLLING FUNGI ON PLANTS WITH TRICHLOROISOCYANURIC ACID
Everett E. Gilbert, Morris Township, Morris County, N.J., assignor to Allied Chemical Corporation, New York, N.Y., a corporation of New York
No Drawing. Filed Oct. 22, 1959, Ser. No. 847,915
5 Claims. (Cl. 167—33)

This invention relates to a method of retarding and preventing fungus growth on growing plants by application thereto of trichloroisocyanuric acid and to wettable powder compositions containing trichloroisocyanuric acid together with other materials forming therewith a powder dispersible in water to give an aqueous composition suitable for spraying on living plants to retard and prevent fungus growth on the plants.

Trichloroisocyanuric acid can be made by passing chlorine into a solution of cyanuric acid in a 5% solution of potassium hydroxide. I have discovered that it has surprisingly high effectiveness for retarding and preventing fungus growth on plants, and when applied thereto in small dosages as a dispersion in water, can be effectively used as a fungicide without serious injury to the plant itself. This active fungicide material is also suitably applied to the plant as a dusting powder in which the trichloroisocyanuric acid is mixed with, for example, 9 to 99 times its own weight of inert diluent, all of the ingredients being in the finely divided powder form customary in dusting compounds for application to plants.

For the preparation of fungicidal dusting compounds, the finely divided trichloroisocyanuric acid is intimately mixed with finely divided dry solid talc, clays such as attapulgite, kaolin or fuller's earth, wood flour or other inert solid carriers of the types commonly employed in formulating fungicidal powder compositions. Wettable formulations, suitable for dispersing in water and applying the water dispersions to the plants, are prepared by incorporating in any of these dusting compounds small amounts of ionic surface active materials, for example, about 1% to about 5%, by weight, which serve to maintain the finely powdered composition dispersed in water with which it is mixed. Suitable surface active materials are the anionic and cationic, wetting, dispersing and emulsifying agents commonly employed in the formulation of wettable powder compositions, for example, the alkali metal and ammonium salts of long chain aliphatic carboxylic acids, sulfonates of the aromatic or long chain aliphatic hydrocarbons, such as sodium alkyl sulfates and sulfonates, alkyl aryl sulfonate salts, sulfonates of glycerides and their fatty acids, and sulfonates of derivatives of fatty acid esters. In general it is preferred to employ the anionic surface active agents and to formulate these wettable powders containing the trichloroisocyanuric acid to include both wetting agent and dispersant or emulsifying agent, which is common practice in preparing formulations of powdered materials to be dusted onto or, dispersed in water, sprayed onto living plants.

Spray formulations can also be prepared by dissolving trichloroisocyanuric acid in suitable organic solvents such as acetone, and dispersing this solution in water. Concentrated solutions of the trichloroisocyanuric acid in such water soluble solvents may be prepared and dispersed in water to give an aqueous spray of suitable concentration of the trichloroisocyanuric acid for application to the plants. In general the aqueous dispersions which are applied to living plants will contain about ¼ lb. to about 2 lbs., preferably about ½ lb. to about 1 lb. of the trichloroisocyanuric acid for every 100 gallons of water.

The following examples are further illustrative of processes of my invention for control of fungi growth and of wettable powder compositions and aqueous dispersions of the trichloroisocyanuric acid suitable for application to living plants. All solution strengths expressed in percentages or parts in these examples are by weight unless otherwise specified.

*Example 1.*—A 1% acetone solution of trichloroisocyanuric acid was diluted with varying quantities of water and these diluted solutions were tested in standard spore germination tests against spores of *Sclerotinia fructicola* (brown rot of stone fruits). The spores were produced by growing the fungus on potato dextrose agar for one week. The spores were taken up in an 0.5% sodium citrate solution which acts as a stimulant to spore germination. Portions of this spore suspension with addition to the several diluted trichloroisocyanuric acid solutions were incubated 24 hours at 65° C. Like specimens of the spore suspension with addition of copper sulfate (as a standard fungicide) and of tap water were also prepared and incubated for comparative and check purposes, respectively.

At a dosage as low as 1 part per million of trichloroisocyanuric acid, complete control of the spores was obtained (0% germination as against 91% germination for both the standard and check). For the copper sulfate standard, complete control was obtained at 100 parts per million concentration.

*Example 2.*—The standard procedure described in Example 1 was employed in testing the acetone solution of the trichloroisocyanuric acid diluted with water against the germination of spores of *Stemphylium sarcinaeforme* (target spot of clover), produced by growing the fungus on oatmeal agar and dispersing the spores in an 0.5% sodium citrate solution.

In three such tests at a dosage of 100 parts per million, complete control, 0% spore germination, was obtained with the trichloroisocyanuric acid in each case. For the copper sulfate standard at this low dosage, results varied from 0% to 97% germination, and the check showed 96% germination.

*Example 3.*—A 1% acetone solution of trichloroisocyanuric acid was diluted with water in the ratio 0.834 lb. of the trichloroisocyanuric acid to 100 gallons of water, to give an aqueous dispersion containing 0.1% of the trichloroisocyanuric acid. This was sprayed on the foliage of tomato plants and allowed to dry on the foliage. The plants were then inoculated with zoospores of *Phytophthora infestans* (tomato late blight). The inoculated plants were held in an incubation chamber for 4 days at 70° F. and 100% humidity, after which they were held in a greenhouse for 3 days. The percent defoliation was compared with that occurring on plants similarly sprayed with a standard fungicide spray in general use for protection against late blight, inoculated and held in the greenhouse and with plants inoculated with the zoospores and similarly treated except for no application of a fungicide. The standard fungicide contained N-trichloromethylthio-tetrahydrophthalimide as the toxicant.

In such tests the plants treated with the trichloroisocyanuric acid showed an average defoliation of 2% as compared with an average defoliation of 5% for plants treated with the standard fungicide spray. Defoliation of plants receiving no treatment with a fungicide averaged 50%. Neither the trichloroisocyanuric acid nor the standard fungicide caused any injury to the plants.

*Example 4.*—The following materials were hand mixed and then air milled through a pulverizer to obtain a mixture of which 90–95% passed a 325 mesh screen:

| | Percent |
|---|---|
| Trichloroisocyanuric acid (toxicant) | 50.5 |
| Attapulgite clay (inert diluent) | 46.0 |
| Sodium N-methyl-N-oleoyl taurate (wetting and dispersing agent) | 1.5 |
| Sodium lignin sulfonate (dispersant) | 2.0 |

The resulting wettable powder was dispersed in water in the ratio of 0.834 lb. of the trichloroisocyanuric acid to every 100 gallons of water. This aqueous dispersion, containing 0.1% trichloroisocyanuric acid, was sprayed on apple seedlings until the foliage was well covered with fine droplets. The spray was allowed to dry and the plants were then inoculated with *Venturia inaequalis* conidia (a fungus spore causing apple scab) by spraying them with a standardized spore suspension. The inoculated seedlings were held in an incubation chamber for 48 hours at 70° F. and about 100% humidity and then placed in a greenhouse until 14 days after the time of inoculation. Apple seedlings were similarly sprayed with an 0.125% dispersion of the standard fungicide used in Example 3, which is commonly used to protect apple trees against this apple scab fungus, inoculated, incubated and held in the greenhouse. As a check, apple seedlings were similarly inoculated with these fungus spores, incubated and, without being treated with any fungicide, were held in the greenhouse.

Under the foregoing conditions complete control of the apple scab fungus was obtained, both with the trichloroisocyanuric acid and with the standard fungicide, both as respect the plants as a whole and the leaves of the plant. The plants used as a check all showed infection with apple scab. This infection appeared on 12 leaves and amounted to 49% of the total leaf area. No injury to the plants occurred from use of either the trichloroisocyanuric acid or the standard fungicide.

*Example 5.*—Tomato plants were sprayed with the same 0.1% trichloroisocyanuric acid spray formulation used in Example 4, and the spray was allowed to dry on the plants. The plants were then sprayed with a standardized suspension of zoospores prepared by culturing *Phytophthora infestans* on lima bean agar and incubating the conidia dispersed in sodium citrate solution to induce zoospore production. The plants thus inoculated were held in an incubation chamber for 4 days at 70° F. and 100% humidity and then placed in a greenhouse for 3 days. Other tomato plants sprayed with an 0.125% dispersion of the standard fungicide used in Example 3 and unsprayed check plants, were similarly inoculated, incubated and placed in the greenhouse. At the end of the 3 days in the greenhouse, the plants sprayed with the trichloroisocyanuric acid showed zero defoliation, no blight and no plant injury. One plant sprayed with the standard fungicide showed total defoliation and blight while others showed no defoliation or blight. The inoculated but unsprayed plants all showed blight and averaged 53% defoliation.

I claim:

1. The process of preventing and retarding fungus growth on living plants which comprises applying to said plants a dusting powder containing trichloroisocyanuric acid as the active fungicidal material mixed with 9 to 99 times its own weight of finely divided, inert solid as a carrier therefor.

2. The process of claim 1 in which the plants are tomato plants.

3. The process of claim 1 in which the plants are apple plants.

4. The process of preventing and retarding fungus growth on living plants which comprises spraying said plants with a dispersion of trichloroisocyanuric acid in water in the proportions of about ¼ lb. to about 2 lbs. of the trichloroisocyanuric acid for every 100 gallons of water.

5. The process of claim 4 in which the plants are sprayed with an aqueous dispersion of a wettable powder consisting of trichloroisocyanuric acid as the active fungicidal material mixed with 9 to 99 times its weight of finely divided inert solid as a carrier for the trichloroisocyanuric acid in said wettable powder and about 1% to about 5%, by weight of the wettable powder, of a surface active, ionic wetting agent, said aqueous dispersion containing about ¼ lb. to about 2 lbs. of the trichloroisocyanuric acid for every 100 gallons of water.

References Cited in the file of this patent

UNITED STATES PATENTS

| 2,607,738 | Hardy | Aug. 19, 1952 |
| 2,789,078 | Trusler | Apr. 16, 1957 |
| 2,913,460 | Brown et al. | Nov. 17, 1959 |

FOREIGN PATENTS

| 479,506 | Great Britain | Apr. 30, 1936 |

OTHER REFERENCES

Nogasawa, Chem. Abstracts, vol. 51, 15060$_b$, September-October 1957.